United States Patent
Maeda

(10) Patent No.: US 7,983,550 B2
(45) Date of Patent: Jul. 19, 2011

(54) FOCUS ADJUSTING APPARATUS, CAMERA INCLUDING THE SAME, AND METHOD FOR ADJUSTING FOCUS OF OPTICAL SYSTEM

(75) Inventor: Toshiaki Maeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 127 days.

(21) Appl. No.: 12/274,731

(22) Filed: Nov. 20, 2008

(65) Prior Publication Data
US 2009/0148146 A1 Jun. 11, 2009

(30) Foreign Application Priority Data
Dec. 7, 2007 (JP) ................................. 2007-316743

(51) Int. Cl.
*G03B 13/36* (2006.01)
(52) U.S. Cl. ........................................................ 396/123
(58) Field of Classification Search .................... 396/80, 396/123
See application file for complete search history.

(56) References Cited

U.S. PATENT DOCUMENTS

| | | | |
|---|---|---|---|
| 5,422,673 A | 6/1995 | Kondo et al. | |
| 7,747,158 B2 * | 6/2010 | Ueda | 396/125 |
| 2007/0030381 A1 * | 2/2007 | Maeda | 348/345 |
| 2007/0296848 A1 * | 12/2007 | Terashima | 348/345 |
| 2010/0201864 A1 * | 8/2010 | Takayama | 348/349 |

FOREIGN PATENT DOCUMENTS
JP 2003-121721 4/2003
* cited by examiner

*Primary Examiner* — W. B. Perkey
(74) *Attorney, Agent, or Firm* — Ditthavong Mori & Steiner, P.C.

(57) ABSTRACT

A focus adjusting apparatus includes an imaging unit, a calculation unit, a detection unit, and a control unit. The imaging unit is configured to generate an imaging signal of an image formed by an optical system. The calculation unit is configured to calculate based on the imaging signal a focus evaluation value in accordance with a focus adjustment position of the optical system. The detection unit is configured to detect a state with respect to a size of the image. The control unit is configured to control focus adjustment of the optical system based on a rate of change in the focus evaluation value and the state with respect to the size of the image.

22 Claims, 6 Drawing Sheets

FIG.3

| SIZE OF SPECIFIC SUBJECT AREA | WEIGHT COEFFICIENT |
|---|---|
| ~10pix | 0 |
| 10~30pix | 0.3 |
| 30~80pix | 0.7 |
| 80~150pix | 1.0 |
| 150pix~ | 1.5 |

FIG.6

| | ITEM | CONTENT | SETTING EXAMPLE |
|---|---|---|---|
| A | RATE OF CHANGE IN EVALUATION VALUE | GREATER THE RATE OF CHANGE, THE GREATER THE POINT | 10% = ONE POINT |
| B | CURRENT FOCUS POSITION | CLOSER THE POSITION, THE GREATER THE POINT | $(1-1/R) \times 5$ |
| C | STANDARDIZED SUBJECT SIZE | GREATER THE STANDARDIZED SUBJECT SIZE, THE GREATER THE POINT | SIZE = POINT |
| D | RATE OF CHANGE IN SUBJECT SIZE | GREATER THE RATE OF CHANGE VARIATION, THE GREATER THE POINT | 10% = ONE POINT |
| E | SUBJECT BRIGHTNESS | TABLE VALUE | BRIGHTNESS $> \alpha$ : 1<br>BRIGHTNESS $\leq \alpha$ : 0.5 |

FOCUS ADJUSTING APPARATUS, CAMERA INCLUDING THE SAME, AND METHOD FOR ADJUSTING FOCUS OF OPTICAL SYSTEM

CROSS-REFERENCE TO RELATED APPLICATIONS

The present application claims priority under 35 U.S.C. §19 to Japanese Patent Application No. 2007-316743, filed Dec. 7, 2007. The contents of this application are incorporated herein by reference in their entirety.

BACKGROUND OF THE INVENTION

1. Field of the Invention

The present invention relates to a focus adjusting apparatus, a camera including the focus adjusting apparatus, and a method for adjusting focus of an optical system.

2. Description of the Related Art

Conventionally, in electronic cameras such as digital still cameras, so-called hill-climbing contrast detection AF is known that performs AF using a focus evaluation value obtained based on a high-frequency component of an image imaged by an imaging device. In such cameras, at the time of moving-image shooting where focus adjustment is always performed on a subject or at the time of a continuous AF operation, when the focus evaluation value is changed by a predetermined amount, it is determined that the state of the subject in an AF area has been changed and thus an AF operation restarts (refer to, for example, Japanese Patent Application Laid-Open No. 2003-121721). The contents of Japanese Patent Application Laid-Open No. 2003-121721 are incorporated herein by reference in their entirety.

SUMMARY OF THE INVENTION

According to one aspect of the present invention, a focus adjusting apparatus includes an imaging unit, a calculation unit, a detection unit, and a control unit. The imaging unit is configured to generate an imaging signal of an image formed by an optical system. The calculation unit is configured to calculate based on the imaging signal a focus evaluation value in accordance with a focus adjustment position of the optical system. The detection unit is configured to detect a state with respect to a size of the image. The control unit is configured to control focus adjustment of the optical system based on a rate of change in the focus evaluation value and the state with respect to the size of the image.

According to another aspect of the present invention, a camera includes the focus adjusting apparatus.

According to further aspect of the present invention, a method for adjusting focus of an optical system includes generating an imaging signal of an image formed by the optical system. Based on the imaging signal, a focus evaluation value is calculated in accordance with a focus adjustment position of the optical system. A state with respect to a size of the image is detected. Focus adjustment of the optical system is controlled based on a rate of change in the focus evaluation value and the state with respect to the size of the image.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 3 is a diagram showing an example of weight coefficients according to the embodiment of the present invention;

FIG. 6 is a table for describing evaluation items A to E.

DESCRIPTION OF THE EMBODIMENTS

Figure 1:
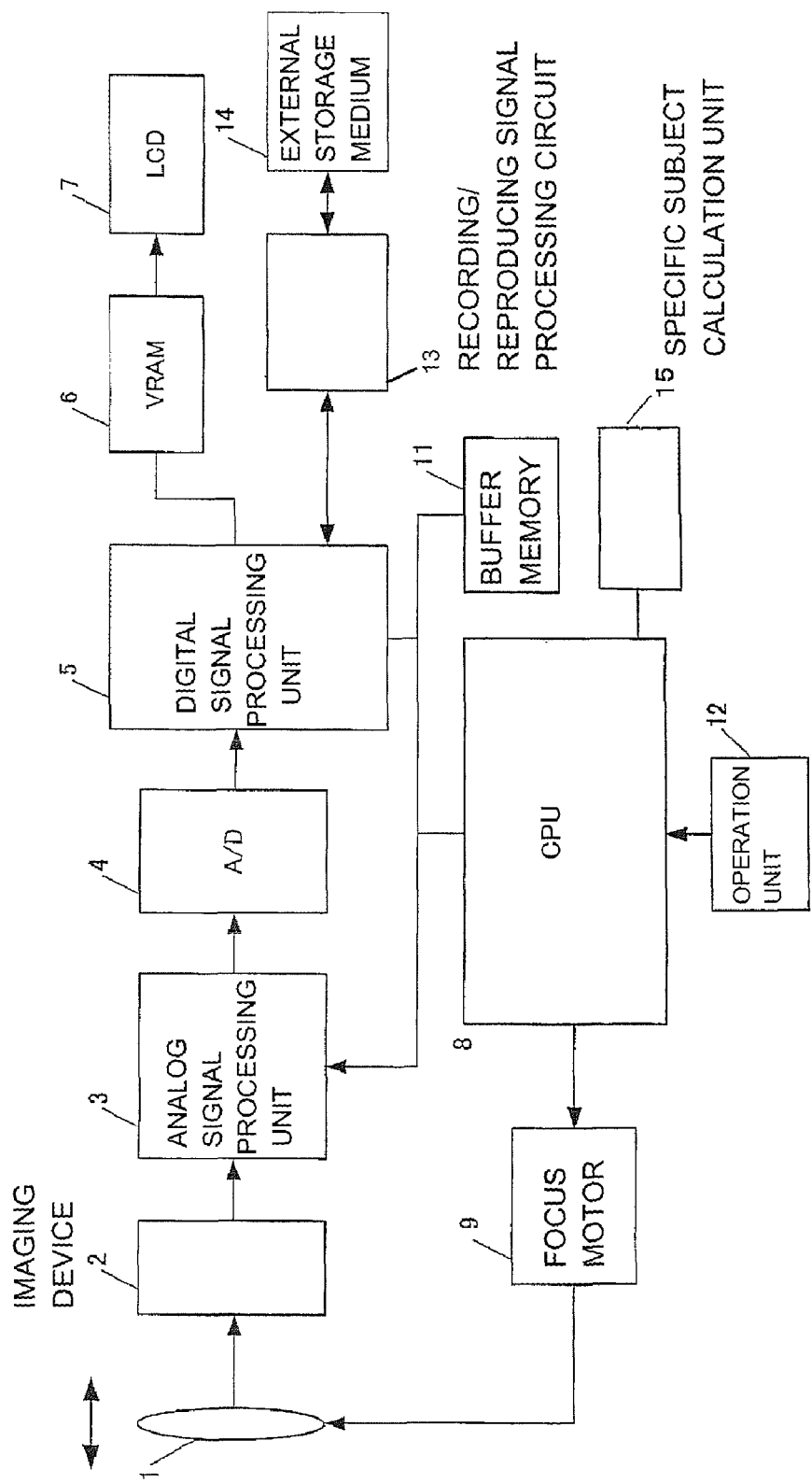
FIG. 1 is a block diagram showing a focus adjusting apparatus according to an embodiment of the present invention.

The embodiments will now be described with reference to the accompanying drawings, wherein like reference numerals designate corresponding or identical elements throughout the various drawings.

When the subject moves in a direction orthogonal to an optical axis and thus a part of the subject goes out of an AF area or when a person (subject) facing the front looks away, the focus evaluation value changes despite no change in subject distance. Hence, in conventional restart methods in which when a change in focus evaluation value equals or exceeds a threshold value an AF restart is performed, even when there is no change is subject distance, an AF restart is performed. As a result, inconveniences are caused such as a blurred image being shot during moving-image shooting or power being wastefully consumed due to an unnecessary AF operation.

According to an embodiment of the present invention, focus adjustment of an optical system is controlled based on the rate of change in focus evaluation value and a state of the size of an image, and thus, more appropriate focus adjustment control can be performed over conventional cases.

FIG. 1 is a diagram showing a camera having a focus adjusting apparatus according to an embodiment of the present invention and is a block diagram of a digital camera. A shooting lens 1 includes a focusing lens (not shown) for performing focus adjustment and a variable magnification lens (not shown) for changing focus distance. By driving the focusing lens by a focus motor 9, focus adjustment of the shooting lens 1 is performed. Generally, as the focus motor 9, a stepping motor is used and open-loop control is performed by pulse drive by a CPU 8.

A subject image formed by the shooting lens 1 is projected onto an imaging plane of an imaging device 2 and the imaging device 2 outputs an electrical signal (imaging signal) according to the light intensity of the subject image formed on the imaging plane. By driving the focusing lens by the focus motor 9 to perform focus adjustment, a focused subject image is formed on the imaging plane. As the imaging device 2, a CCD imaging device, a MOS imaging device, or the like, is used. The imaging signal outputted from the imaging device 2 is inputted to an analog signal processing unit 3.

In the analog signal processing unit 3, a CDS circuit, an AGC circuit, a color separation circuit, etc., are provided. The CDS circuit performs a correlated double sampling (CDS) process in which noise of an imaging signal is reduced. The AGC circuit performs an auto gain control (AGC) process in which the level of an image signal is adjusted by gain adjustment. The imaging signal processed by the analog signal processing unit 3 is converted by an A/D converter 4 from an analog signal to a digital signal.

The A/D converted signal is inputted to a digital signal processing unit 5 and the CPU 8. The digital signal processing unit 5 includes signal processing circuits such as a gain control circuit, a brightness signal generating circuit, and a color difference signal generating circuit. The digital signal processing unit 5 performs various image processes, such as edge enhancement, gamma correction, and white balance adjustment, on the inputted imaging signal. Note that the imaging signal inputted to the digital signal processing unit 5 is temporarily stored in a buffer memory 11. The imaging signal is read out from the buffer memory 11 each time each of the above-described processes is performed. Then, a signal obtained after the processes is stored in the buffer memory 1 again. The buffer memory 1 is a frame memory capable of storing data for a plurality of frames imaged by the imaging device 2.

Image data having been subjected to a series of processes by the digital signal processing circuit 5 and then stored in the buffer memory 11 is recorded in an external storage medium 14, such as a memory card, through a recording/reproducing signal processing circuit 13. When image data is recorded in the external storage medium 14, generally, data compression is performed using a predetermined compression format, e.g., a JPEG format. The recording/reproducing signal processing circuit 13 performs a data compression process when image data is recorded in the external storage medium 14 and performs a data decompression process when compressed image data is read in from the external storage medium 14. The recording/reproducing signal processing circuit 13 also includes an interface for performing data communication with the external storage medium 14.

An LCD monitor 7 functions as an EVF (Electronic View Finder) in a shooting mode. Specifically, imaging signals imaged by the imaging device 2 at predetermined time intervals are subjected to signal processing by the analog signal processing circuit 3, the A/D converter 4, and the digital signal processing circuit 5. Thereafter, the processed signals are stored in the buffer memory 11 and are also transferred to a VRAM 6. An image, called "through image", based on image data stored in the VRAM 6 is displayed on the LCD monitor 7. In the case of a playback mode where image data stored in the external storage medium 14 is displayed as an image on the LCD monitor 7, image data read out from the external storage medium 14 is transferred to the VRAM 6 and played back and displayed on the LCD monitor 7. In an operation unit 12 for providing operation instructions and performing various settings by a user, for example, a release button and setting buttons for performing various settings are provided.

The CPU 8 that performs overall control of the camera includes an AE calculation unit, an AF calculation unit, an AWB calculation unit, and other calculation units. The AE calculation unit performs automatic exposure calculation for shooting a subject at correct exposure, based on an imaging signal from the A/D converter 4. The AWB calculation unit performs a setting of a white balance adjustment gain based on image signals (R, G, and B signals) from the A/D converter 4.

The AF calculation unit calculates a focus evaluation value which is used when adjusting the focus of the shooting lens 1. In the case of a shooting mode where specific subject recognition by a specific subject calculation unit 15, which will be described later, is performed, the AF calculation unit extracts a predetermined high-frequency component from a spatial frequency of image data in a specific subject area and adds up the absolute values of extracted high-frequency components. On the other hand, in the case of a normal shooting mode where specific subject recognition is not performed, as is conventionally known, a predetermined high-frequency component is extracted from a spatial frequency of image data in a preset AF area and the absolute values of extracted high-frequency components are added up. For example, in the case of multi-area AF, a plurality of AF areas with a predetermined size are arranged at predetermined locations in a screen. An added-up value obtained therefrom is a focus evaluation value and represents the contrast of an image in the AF areas or specific subject areas set as AF areas.

The CPU 8 moves the focusing lens of the shooting lens 1 to a lens position where the focus evaluation value calculated by the AF calculation unit is at its peak, and then performs a focus adjustment operation. Note that detail of an AF operation will be described later.

The specific subject calculation unit 15 compares template image data (reference image data) with an imaged image to detect a specific subject region in the image. A specific subject detection function includes, for example, face recognition. A plurality of template image data units are stored in advance in a ROM of the CPU 8 and the user can select a desired template image data unit therefrom. Alternatively, the user may specify a specific subject region in a shot image and store the image as a template image.

The specific subject calculation unit 15 stores template image data in the buffer memory 11 and also searches, by a pattern matching method, through images that are repeatedly shot (images for displaying a through image in a continuous AF operation which will be described later) for a region in image data that matches template image data. Then, when a specific subject is recognized in an image, coordinates representing the location and size of a recognized specific subject area (e.g., a rectangle) are outputted to the CPU 8. When the coordinates are inputted to the CPU 8 from the specific subject calculation unit 15, the CPU 8 performs, for example, an AF operation on the specific subject or an operation of tracking the specific subject, based on information on the coordinates. Alternatively, the CPU 8 generates images in which a face area mark is overlapped on images for displaying a through image and displays the images on the LCD monitor 7.

Although the following describes, as an example, AF restart for the case of always performing AF, such as moving-image shooting, the invention can also be similarly applied to an AF operation called "continuous AF" in another embodiment. Generally, in a digital camera, when in shooting mode, imaged images are displayed on the LCD monitor 7 as a through image. When through-image display is performed, an AF operation, called "continuous AF", may be adopted in which an AF operation is repeatedly performed regardless of a half-press operation of the release button. When a focus evaluation value is changed by a predetermined amount, it is determined that a subject state in a focus detection region has been changed and thus an AF operation restarts. Therefore, the aforementioned problems also occur when a continuous AF operation is performed. Hence, in the present embodiment, by using a calculation result of the specific subject calculation unit 15 in addition to a change in focus evaluation value, as will be described later, a more appropriate restart operation is performed.

Figure 2:
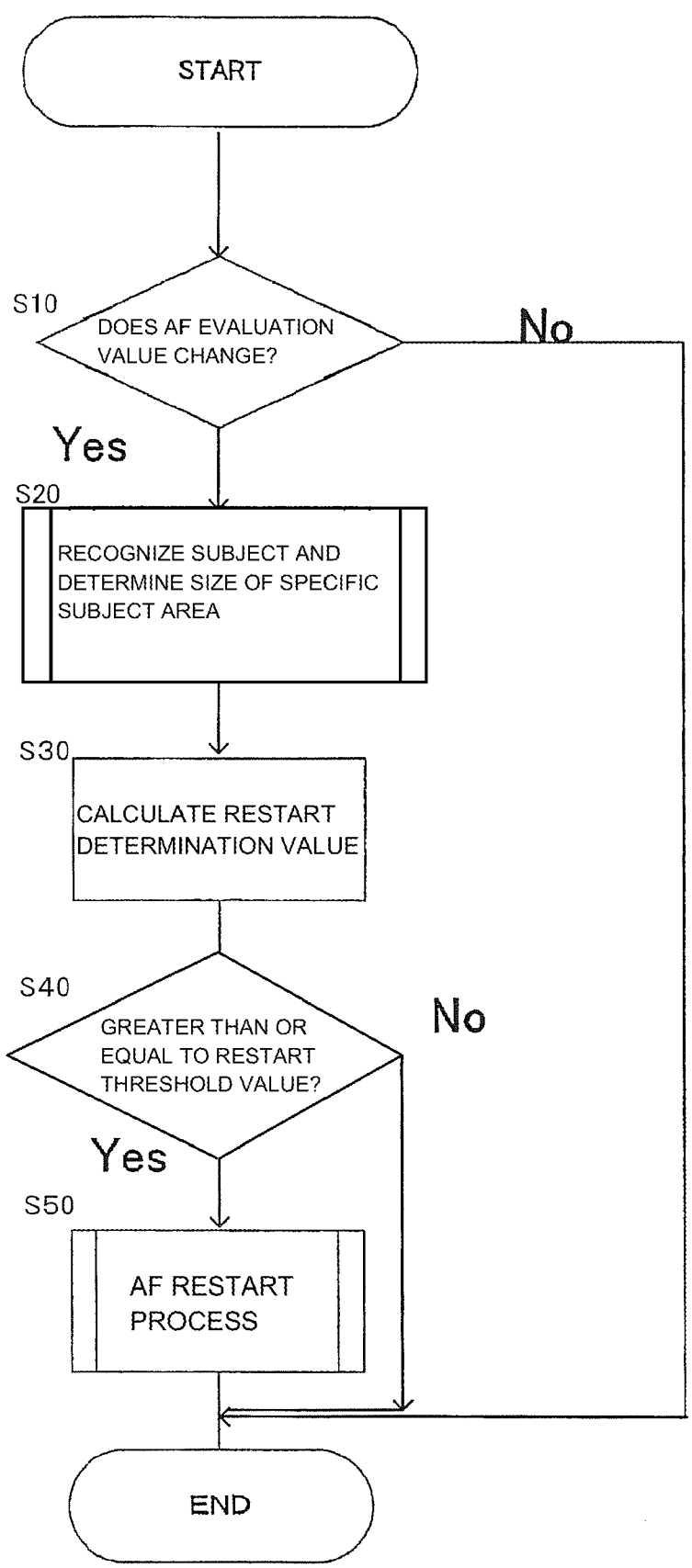
FIG. 2 is a flowchart for describing a restart operation according to the embodiment of the present invention.

FIG. 2 is a flowchart for describing a restart operation in the present embodiment. A series of processes are performed by the CPU 8 executing a program associated with a restart operation. An example of FIG. 2 shows an AF restart operation upon moving-image shooting for the case in which the camera is set to a shooting mode where specific subject recognition is performed. Of course, such an operation can also be similarly applied to AF restart in continuous AF. The processes shown in FIG. 2 are performed in a state in which the focusing lens is stopped (upon non-AF operation) and each time a focus evaluation value is obtained.

In step S10, an obtained focus evaluation value is compared with an immediate preceding focus evaluation value to determine whether the focus evaluation value has been changed. Here, since the camera is set to a shooting mode where specific subject recognition is performed, as described above, a focus evaluation value of an image in a specific subject area is obtained. If it is determined in step S10 that the focus evaluation value has been changed, then processing proceeds to step S20. If it is determined in step S10 that the focus evaluation value has not been changed, then the restart process ends. Here, it is not that the focus evaluation value is determined to have not been changed only when the two focus evaluation values exactly match; in practice, when the magnitude of a difference between the focus evaluation values is smaller than a predetermined threshold value, it is determined that the focus evaluation value has not been changed.

In step S20, the specific subject calculation unit 15 performs specific subject recognition by pattern matching using a template and determines a size of a recognized specific subject area. The size of a specific subject area represents a state of the size of a specific subject image in an image. For example, when the specific subject area is rectangular, the length of the long side, the area of a rectangular area, or the like, is used. Here, the size of the long side of a rectangular area is considered as the size. Note that the size used here is a size represented by a pixel unit of an image.

In step S30, based on the obtained focus evaluation values and the size of a specific subject area determined in step S20, a restart determination value is calculated by the following equation (1). In equation (1), the rate of change in evaluation value represents an increase/decrease of a focus evaluation value obtained this time relative to a previous focus evaluation value in percentage terms. The standardized subject size represents an amount expressed in the ratio of the size of a specific subject area to the size of a focus detection region. For example, when multi-area AF is set, the size of one AF area that is set in plural number corresponds to the size of a focus detection region. Specifically, when the size of a specific subject area is smaller than that of a focus detection region, the standardized subject size is smaller than 1 and thus it becomes more difficult to restart over conventional cases. In contrast, when the size of a specific subject area is larger than that of a focus detection region, the standardized subject size is greater than 1 and thus ease of restart increases over conventional cases.

$$(\text{restart determination value}) = (\text{rate of change in evaluation value}) \times (\text{standardized subject size}) \quad (1)$$

Note that as the standardized subject size a nonlinear standardized one, as shown in equation (2), may be used. Furthermore, instead of the size of a focus detection region, with reference to the size of a screen, a standardized subject size may be set.

$$\{(\text{size of a specific subject area})/(\text{size of a focus detection region})\}^{1/2} \quad (2)$$

In equation (1), instead of the standardized subject size, a weight coefficient such as that shown in FIG. 3 may be used. The size of a specific subject area may be a pixel size of the long side of a set rectangular area or may be one that represents the area of a rectangular area by the number of pixels. These weight coefficients are stored in advance in the ROM as a table.

Since the standardized subject size may vary due to a disturbance such as camera shake, standardized subject sizes may be determined for a plurality of respective images obtained in time series and an average of the standardized subject sizes may be taken to smooth the standardized subject size. By performing such a process, hunting of restart caused by variation in standardized subject size due to a disturbance, etc., can be suppressed.

In step S40, it is determined whether the restart determination value calculated in step S30 is greater than or equal to a preset restart threshold value. If it is determined that the restart determination value is greater than or equal to the restart threshold value, then processing proceeds to step S50 where an AF restart process is performed. If it is determined that the restart determination value is smaller than the restart threshold value, then step S50 is skipped and the series of processes associated with a restart operation ends.

Figure 4:
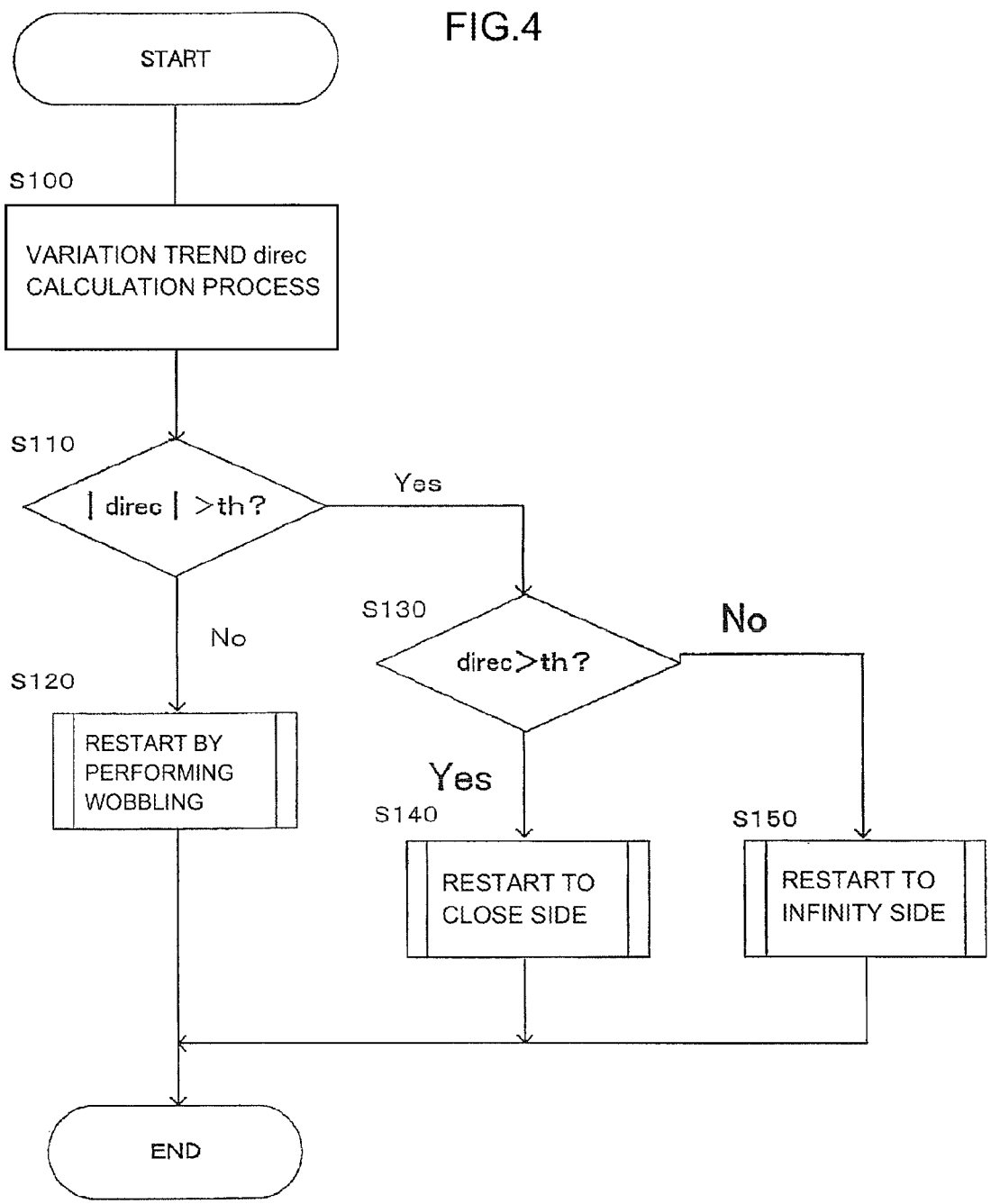
FIG. 4 is a flowchart showing a detail of a restart process according to the embodiment of the present invention.

FIG. 4 is a flowchart showing a detail of the AF restart process in step S50. In step S100, a history of the last n standardized subject sizes is saved and based on the history a variation trend direc of the standardized subject size is calculated. In this case, a detection reliability obtained when a specific subject is detected that is greater than or equal to a predetermined level is saved as a history.

As the variation trend direc, for example, a slope determined by performing linear approximation on n history data units by a least squares method or the like, or a weighted moving average in which weights are assigned in time series is used. The following equations (3) and (4) indicate a calculation method of the variation trend direc for the case of using a weighted moving average. In equation (3) for determining a weighted moving average, ObjSize(0) represents the latest standardized subject size and ObjSize(n) represents an n-th previous standardized subject size to the latest value. A plurality of calculated weighted moving averages are saved, and as shown in equation (4), a value obtained by subtracting the third previous weighted moving average SizeTrend(3) from the latest weighted moving average SizeTrend(0) is used as the variation trend direc.

The variation trend direc is a parameter for determining a movement start method at restart. When, in step S100, the variation trend direc has been calculated, processing proceeds to step S110 where it is determined whether the absolute value of the variation trend direc is greater than a threshold value th. If the absolute value of the variation trend direc is less than or equal to the threshold value th, it indicates the case in which, though there is a variation in focus evaluation value, a variation in standardized subject size is very small. In this case, by performing a wobbling operation near the current location, a restart start moving direction is determined. Specifically, if it is determined in step S110 that the absolute value of the variation trend direc is less than or equal to the threshold value th, then processing proceeds to step S120 where a wobbling operation is performed to determine a restart start moving direction and then an AF restart is performed.

On the other hand, if it is determined in step S110 that the absolute value of the variation trend direc is greater than the threshold value th, then processing proceeds to step S130 where it is determined whether the variation trend direc is greater than the threshold value th. Specifically, it is determined whether the variation trend direc is in an increase trend (direc>th) or a decrease trend (direc<-th). Here, the variation trend direc being in an increase trend indicates that the standardized subject size of the specific subject is greater than that obtained in the past and thus it can be determined that the subject has come closer to the camera. In contrast, when the variation trend direc is in a decrease trend, it can be determined that the subject has moved away from the camera.

If it is determined in step S130 that direc>th, then it is determined that the subject has come closer to the camera and thus processing proceeds to step S140 where the focusing lens is caused to start to move to the close side and then an AF restart is performed. On the other hand, if it is determined in step S130 that direc<-th, then it is determined that the subject has moved away from the camera and thus processing proceeds to step S150 where the focusing lens is caused to start to move to the infinity side and then an AF restart is performed. Then, when the AF by restart in step S120, S140, or S150 has been completed, the restart process shown in FIG. 4 ends and processing returns to the flow in FIG. 3.

Figure 5:
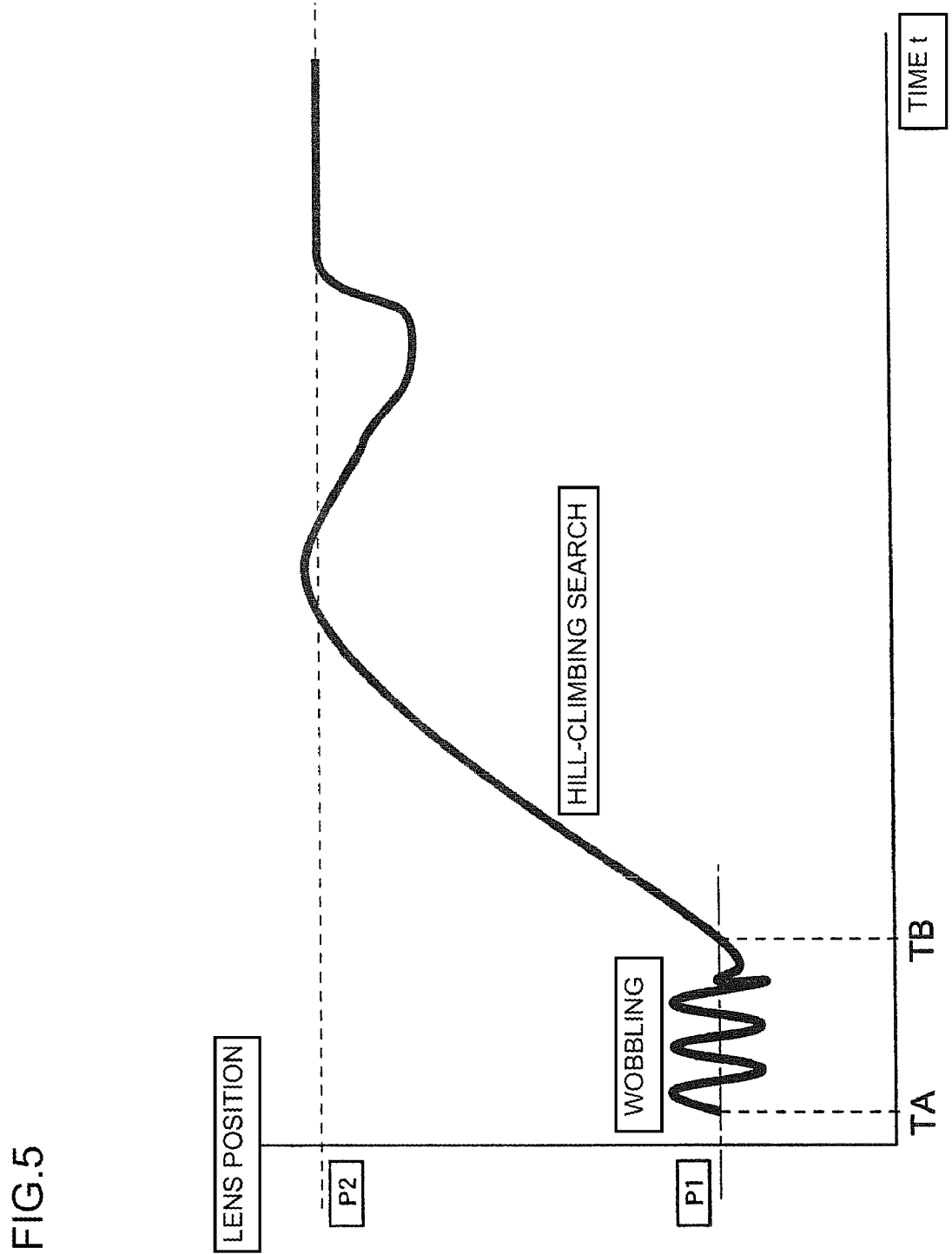
FIG. 5 is a graph for describing lens drive performed upon AF restart according to the embodiment of the present invention.

FIG. 5 is a graph for describing lens drive performed upon AF restart. P1 indicates a lens position upon restart and P2 indicates a lens position where the focus evaluation value is at its peak. When processing proceeds from step S110 to step S120, wobbling starts at point TA. If it is found by a wobbling operation that a direction in which the focus evaluation value increases is a direction of the lens position P2, then a hill-climbing search in the direction of the lens position P2 starts. Note, however, that when, as a result of the wobbling, a focus evaluation value at the point TA is greater than focus evaluation values in back and forth positions, P1 is determined to be a focus position and the search ends. On the other hand, when an AF restart is performed in step S140 or S150, a restart starts from point TB.

Note that when a zooming operation for changing the focus distance of the shooting lens is performed, too, the size of a subject image changes. Therefore, when a zooming operation is performed, the zooming operation is detected by a change in focus distance information outputted from the shooting lens and a specific subject area or standardized subject size that has been detected before the detection is made invalid. Then, after the zooming operation, a specific subject area or standardized subject size may be detected again. Alternatively, by a change in magnification by the zooming operation, a change in specific subject area or standardized subject size may be corrected.

Specifically, when a zooming operation is detected, a specific subject area or standardized subject size that is detected immediately before the zooming operation is stored so as to be associated with a focus distance. Subsequently, after the zooming operation, a subject detection process is performed in the above-described manner to determine a specific subject area or standardized subject size. Then, the ratio between the specific subject areas or standardized subject sizes that are obtained before and after the zooming operation is corrected by a magnification ratio by focus distances obtained before and after the zooming operation and a change in specific subject area or standardized subject size that is not affected by the change in focus distance is determined. Based on the thus obtained change in the corrected specific subject area or standardized subject size, it is determined whether an AF restart is performed.

Note that for a focus evaluation value for the case in which a zooming operation is performed, since the spatial frequency of an image included in an image in an AF area with a specified size relative to a shooting screen changes, it is better not to use a variation in focus evaluation value to make a determination as to whether an AF restart is performed, as is done above. Hence, when a zooming operation is performed, a determination as to whether an AF restart is performed should be made independent of a variation in focus evaluation value, but based on a change in specific subject area or standardized subject size obtained after correcting an influence of a change in focus distance.

Although in the above-described embodiment a determination as to whether an AF restart is performed is made based on the size/magnitude of or the rate of change in a specific subject area or standardized subject size, the configuration may be such that an AF restart is not performed when a change in face direction is detected by the above-described face recognition or when it is detected that a detected face goes out of an AF area. By this configuration, even when the focus evaluation value is changed due to a change in face direction or the face going out of an AF area, the camera does not sensitively react to such a change and does not carelessly perform AF.

(Variant)

In the above-described embodiment, even when the subject distance is the same, the standardized subject size varies depending on the actual size of a specific subject and thus ease of restart also varies. Hence, in a variant described below, a restart determination value is set taking into account also elements other than the rate of change in evaluation value and a standardized subject size which is a parameter for the size of a specific subject in an image. Here, for evaluation items A to D shown in FIG. 6, points P(A) to P(D) are respectively calculated and the sum of the points P(A) to P(D) is multiplied by a table value E according to the level of subject brightness. The resulting value (see equation (5)) is used as a restart determination value. When the restart determination value expressed in equation (5) is greater than or equal to a restart threshold value, a restart is performed.

$$(\text{restart determination value}) = \{P(A) + P(B) + P(C) + P(D)\} \times P(E) \quad (5)$$

For parameters for the size of a specific subject, in addition to standardized subject size C, the rate of change D in subject size that is obtained from a history of standardized subject sizes is considered. For items other than the parameters for the size of a specific subject, the current lens position B and subject brightness E are considered. The rate of change A in evaluation value and the rate of change D in subject size are set such that the greater the rate of change the greater the point to make restart easy. For example, a variation of 10% is one point. The current lens position B is set such that the smaller the subject distance R, i.e., the closer the subject, the greater the point to make restart easy. For the standardized subject size C, the above-described standardized subject size is directly used as point P(C). For the subject brightness E, values according to brightnesses are held as a table. For example, when the brightness is greater than predetermined brightness α, the value is set to 1 and when the brightness is less than or equal to α, the value is set to 0.5 to make restart difficult. When the subject brightness is low and thus is very dark, the reliability of the focus evaluation value also decreases. Hence, when the brightness is less than or equal to α, E may be set to 0 so as not to perform a restart.

In the above-described embodiment, actions and effects such as those described below are provided. In the present embodiment, the rate of change in focus evaluation value is multiplied by a standardized subject size and the multiplication result (restart determination value) is compared with a restart threshold value. In this case, the closer the subject is to the camera or the longer the focus distance, the greater the standardized subject size and also the greater the restart determination value. In contrast, the further away the specific subject is from the camera, the smaller the restart determination value. That is, even with the same rate of change in focus evaluation value, the further away the specific subject, it is less likely that a restart is performed.

The influence of a blur caused by variation in subject distance is smaller as the specific subject is further away. Therefore, when comparing the case of not performing an AF restart with the case of performing an AF restart, there is no outstanding difference between the two cases. That is, in the present embodiment, when the difference in blur between when an AF restart is performed and when an AF restart is not performed is small, an unnecessary AF restart is avoided, whereby wasteful power consumption is prevented. On the other hand, when the subject distance is small or when the focus distance is long, the standardized subject size increases and the restart determination value also increases and thus an appropriate AF restart is performed.

Meanwhile, in conventional cameras, sine an AF restart operation is performed based on the focus evaluation value of an image in a focus detection region, as described above, when a person facing the front looks away or when a part of a subject goes out of a focus detection region or when ambient brightness is changed, the focus evaluation value changes despite the fact that there is no change in subject distance, causing a problem that an unnecessary AF restart is performed. However, in the present embodiment, such an unnecessary AF restart can be avoided.

In addition, in a restart process, by determining a restart direction using a result of specific subject recognition, the number of restarts by wobbling can be reduced over conventional cases. That is, in a method of determining a restart direction by a wobbling operation, as in conventional cases, prior to start of a hill-climbing search, a wobbling operation such as that shown in FIG. 5 is always performed. On the other hand, in the present embodiment, since a restart direction can be determined using a variation trend direc, a wobbling operation can be reduced to a minimum.

Furthermore, as shown in the variant, by setting a restart determination value taking into account also elements other than the rate of change in evaluation value and a standardized subject size which is a parameter for the size of a specific subject in an image, a more appropriate restart determination can be performed.

Note that although in the above-described embodiment ease of restart is changed according to the standardized subject size, the magnitude of the standardized subject size is dependent on the magnitude of the image-forming magnification of a subject image formed by the shooting lens 1. Since the image-forming magnification is determined by the subject distance and the focus distance, in the case of a camera that does not have a specific subject detection function, ease of restart may be adjusted according to the subject distance and the zoom state, instead of the standardized subject size. In this case, the subject distance and the zoom state can be determined from a detection value of each zoom encoder that detects the lens position of a focusing lens and a variable magnification lens.

Note that although in the above-described embodiment the case of moving-image shooting is described as an example, the present invention can also be similarly applied to the case of continuous AF in another embodiment. Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A focus adjusting apparatus comprising:
    an imaging unit configured to generate an imaging signal of an image formed by an optical system;
    a calculation unit configured to calculate based on the imaging signal a focus evaluation value in accordance with a focus adjustment position of the optical system;
    a detection unit configured to detect a state with respect to a size of the image; and
    a control unit configured to control focus adjustment of the optical system based on a rate of change in the focus evaluation value and the state with respect to the size of the image.

2. The focus adjusting apparatus according to claim 1, wherein the control unit is configured to determine, after controlling the optical system to be in a focus state and stopping the focus adjustment, whether the focus adjustment of the optical system is restarted based on the rate of change in the focus evaluation value and the state with respect to the size of the image.

3. The focus adjusting apparatus according to claim 1, further comprising:
    a recognition unit configured to recognize an image which is formed by an optical system and which corresponds to a predetermined reference image as a target for which the focus evaluation value is determined,
    wherein the detection unit is configured to detect the state based on a size of the target recognized by the recognition unit.

4. The focus adjusting apparatus according to claim 3, wherein the state comprises a rate of change in the size of the target.

5. The focus adjusting apparatus according to claim 3, wherein the calculation unit is configured to calculate the focus evaluation value based on the imaging signal, which corresponds to a focus detection region provided in an image plane provided by the optical system, and wherein the state is determined based on the size of the target and a size of the focus detection region.

6. The focus adjusting apparatus according to claim 1, wherein the detection unit is configured to repeatedly determine a plurality of states of the size of the image, and wherein the control unit is configured to control the focus adjustment based on an average value of the plurality of states.

7. The focus adjusting apparatus according to claim 1, wherein the state comprises an image magnification of the optical system.

8. The focus adjusting apparatus according to claim 7, wherein the image magnification comprises the focus adjustment position of the optical system.

9. The focus adjusting apparatus according to claim 3, further comprising:
    a photometric unit configured to determine brightness of the target based on the imaging signal,
    wherein the control unit is configured to control the focus adjustment based on the brightness determined by the photometric unit.

10. The focus adjusting apparatus according to claim 1, wherein the detection unit is configured to repeatedly detect a plurality of states of the size of the image, and wherein the control unit is configured to determine a direction of the focus adjustment based on a history of the plurality of states of the size of the image.

11. A camera comprising the focus adjusting apparatus according to claim 1.

12. A focus adjusting apparatus comprising:
    imaging means for generating an imaging signal of an image formed by an optical system;
    calculation means for calculating based on the imaging signal a focus evaluation value in accordance with a focus adjustment position of the optical system;
    detection means for detecting a state with respect to a size of the image; and control means for controlling focus adjustment of the optical system based on a rate of change in the focus evaluation value and the state with respect to the size of the image.

13. A method for adjusting focus of an optical system, comprising:
generating an imaging signal of an image formed by the optical system;
adjusting a focus of the optical system based on the imaging signal;
controlling focus adjustment of the optical system based on a state with respect to a size of the image; and
calculating based on the imaging signal a focus evaluation value in accordance with a focus adjustment position of the optical system, the focus adjustment of the optical system being controlled based on a rate of change in the focus evaluation value and the state with respect to the size of the image.

14. The method for adjusting focus of an optical system according to claim 13, further comprising:
determining, after controlling the optical system to be in a focus state and stopping the focus adjustment, whether the focus adjustment of the optical system is restarted based on the rate of change in the focus evaluation value and the state with respect to the size of the image.

15. The method for adjusting focus of an optical system according to claim 13, further comprising:
recognizing an image which is formed by the optical system and which corresponds to a predetermined reference image as a target for which the focus evaluation value is determined; and
detecting the state based on a size of the target.

16. The method for adjusting focus of an optical system according to claim 15, wherein the state comprises a rate of change in the size of the target.

17. The method for adjusting focus of an optical system according to claim 15, further comprising:
calculating the focus evaluation value based on the imaging signal, which corresponds to a focus detection region provided in an image plane provided by the optical system; and
determining the state based on the size of the target and a size of the focus detection region.

18. The method for adjusting focus of an optical system according to claim 13, further comprising:
determining a plurality of states of the size of the image repeatedly; and
controlling the focus adjustment based on an average value of the plurality of states.

19. The method for adjusting focus of an optical system according to claim 13, wherein the state comprises an image magnification of the optical system.

20. The method for adjusting focus of an optical system according to claim 19, wherein the image magnification comprises the focus adjustment position of the optical system.

21. The method for adjusting focus of an optical system according to claim 15, further comprising:
determining brightness of the target based on the imaging signal; and
controlling the focus adjustment based on the brightness.

22. The method for adjusting focus of an optical system according to claim 13, further comprising:
detecting a plurality of states of the size of the image repeatedly; and
determining a direction of the focus adjustment based on a history of the plurality of states of the size of the image.

* * * * *